Oct. 9, 1951   R. L. CHENAULT   2,570,766
ELECTROMECHANICAL TOY
Filed June 20, 1950   2 Sheets-Sheet 1
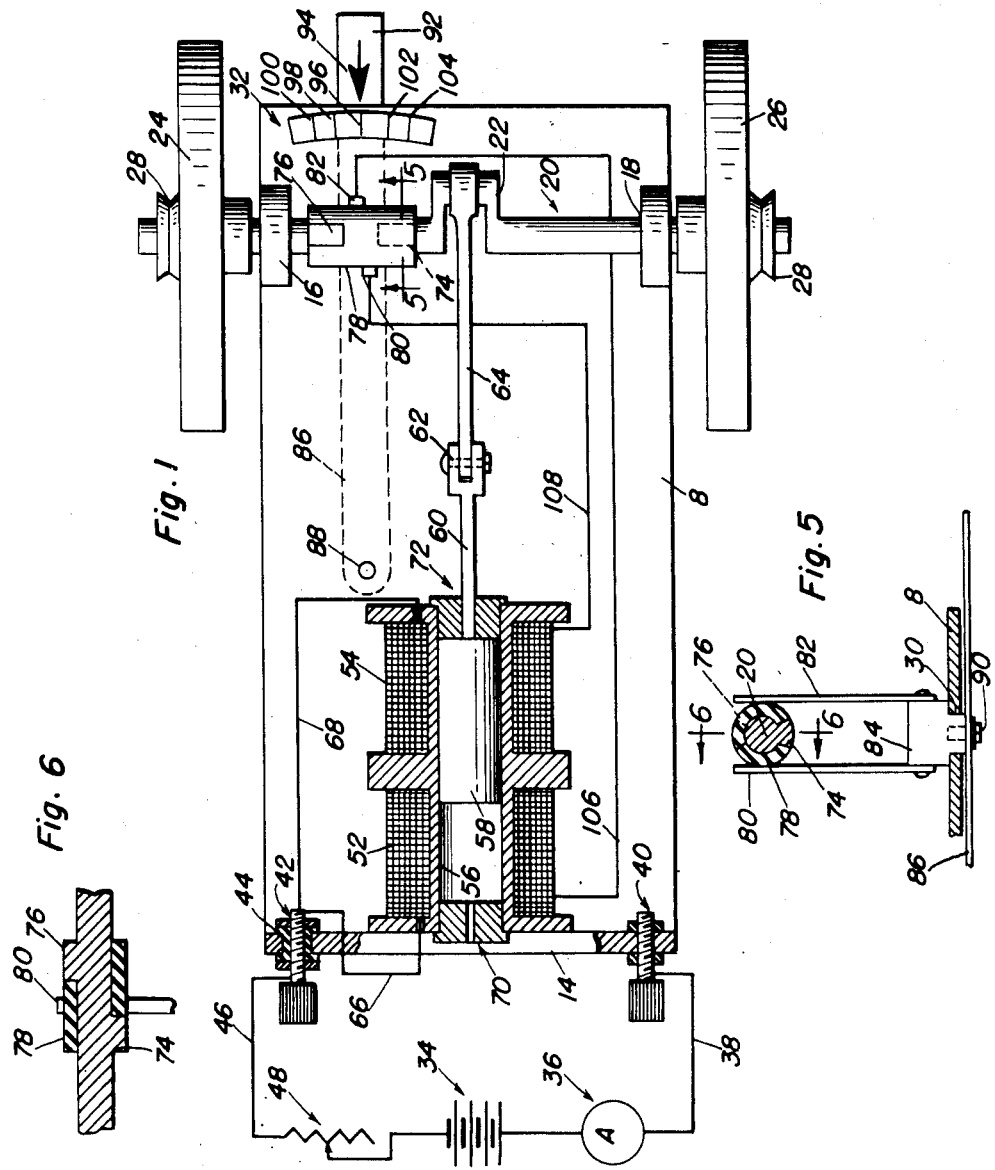
Roy L. Chenault
INVENTOR.

Oct. 9, 1951 — R. L. CHENAULT — 2,570,766
ELECTROMECHANICAL TOY
Filed June 20, 1950 — 2 Sheets-Sheet 2
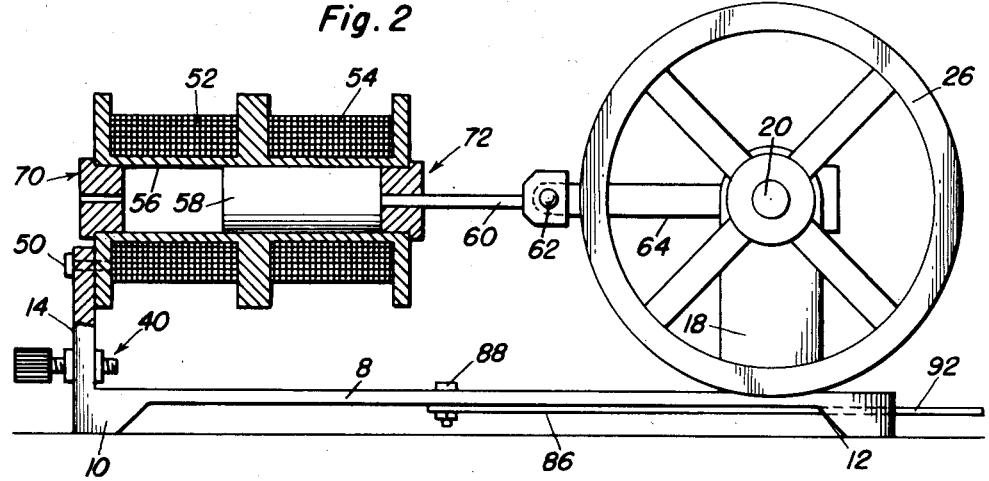
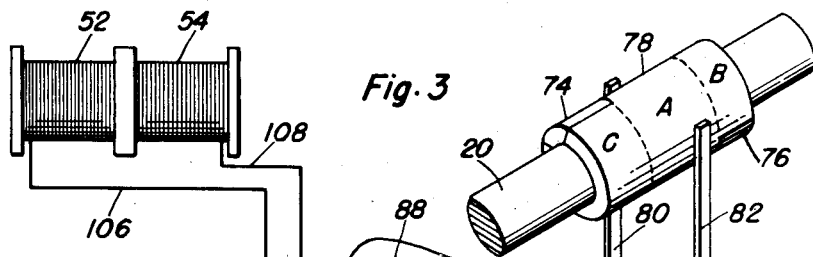
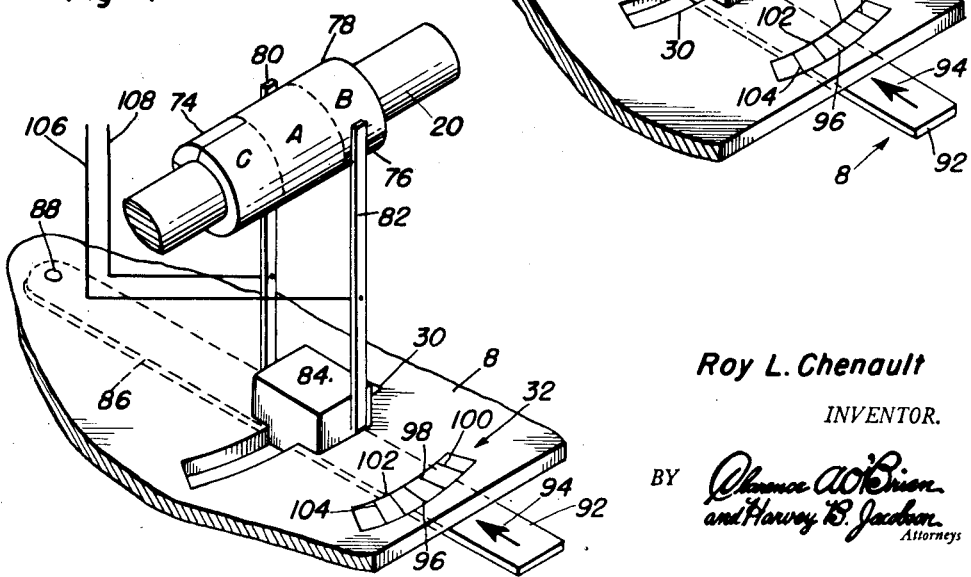
Roy L. Chenault
INVENTOR.

Patented Oct. 9, 1951

2,570,766

UNITED STATES PATENT OFFICE 2,570,766

ELECTROMECHANICAL TOY

Roy L. Chenault, Seneca, Pa., assignor of twenty-five per cent to Calvin A. Wygal and twenty-five per cent to Daisy C. Wygal, both of Washington, D. C.

Application June 20, 1950, Serial No. 169,274

7 Claims. (Cl. 172—126)

The present invention relates to educational appliances and contrivances best known as toys and has more particular reference to a novel structural adaptation of a so-called electromechanical type which is characterized by well known mechanical and electrical devices which are combined and presented for consideration of an observer in a novel manner.

The obvious purpose of the invention, essentially informative and educational in nature, is to acquaint users and others with basic and underlying principles of mechanics and electricity. To this end I have evolved and produced a novel multiple purpose contrivance which, broadly comprehended, is in the nature of an electromagnetic engine wherein the complemental devices are arranged on a simple base so that they may be individually and conjointly examined and studied to acquaint an observer with their construction and mode of operation with requisite clarity and understanding.

More specifically, one phase of the invention has to do with the adoption and use of a simple electromagnetic engine whereby one may familiarize himself with the functioning of a plunger of magnetic material reciprocating in the cylindrical bore of a solenoid coil and how, with the use of a pitman or connecting rod, reciprocating motion, derived from said engine, is translated into rotary motion when the pitman is properly connected with a crank on a rotatably supported crankshaft, the latter having one or more flywheels, whereby the observer may learn what kinetic energy is and how it may be utilized to do work.

Another object of the invention has to do with the use of an electromagnetic engine in which twin electromagnets are assembled in tandem relationship for purposes of demonstrating how, when the individual electromagnets are alternately energized, the student observer may understand the significance of such terms as "single-acting" and "double acting."

It is also an object to inform and acquaint the student with the construction and nature of a solenoid that he may grasp the meaning of coils, plunger of magnetic material and, when the open ends of the cylinder are plugged with inserts of magnetic material, the meaning of such expressions as "solenoid-pull" and "air-gap" pull.

Then, too, novelty is predicated upon the adoption and use of insulated and non-insulated binding posts which are mounted on a base and how same may be utilized in association with a source of energy, such as a battery, with a grounded ammeter and rheostat; and how, with two circuits and coordinated commutator means, the circuits may be controlled to operate the electromagnetic engine either "forward" or in "reverse" as either a single-acting or double-acting prime mover, both forward and in reverse.

An over-all objective is to structurally, functionally and otherwise improve upon similarly constructed and functioning toy engines and machines and, in so doing, to provide a unique toy in which manufacturers, users and others will find their respective requirements and needs fully met, contained and readily available.

Other objects and advantages will become more readily apparent from the following description and the accompanying illustrative drawings.

In the drawings, wherein like numerals are employed to designate like parts throughout the views:

Figure 1 is a top plan view, with certain parts shown in section, of an electro-mechanical toy constructed in accordance with the principles of the instant invention.

Figure 2 is a side elevational view in section and elevation with certain of the details omitted for clearness of illustration.

Figure 3 is a fragmentary perspective view, on an enlarged scale, partly diagrammatic, illustrating the construction and use of the novel manually regulable commutator means.

Figure 4 is a perspective view, similar to Figure 3, showing the same commutator means with the conjointly acting brushes in a given circuit closing position-single-acting forward operation, as obvious.

Figure 5 is a view in section and elevation showing the commutator means, the section being on the plane of the line 5—5 of Figure 1, looking in the direction of the arrows.

Figure 6 is a fragmentary section on the line 6—6 of Figure 5, looking in the direction of the arrows.

By way of introduction to the detailed description, it will be seen that the electromagnetic engine herein described includes two solenoid windings arranged in tandem and properly spaced in relation to the crank stroke and a plunger of magnetic material, to most effectively utilize the electromagnetic attraction of the plunger to impart rotary motion to flywheels on the crankshaft. The arrangement is such that the engine may be operated as a single-acting, or as a double-acting engine, either forward or reverse, with single simple control lever.

The engine also is designed to demonstrate very clearly the components of the magnetic forces generally referred to as the "solenoid pull" and the "air-gap" pull. This is accomplished by providing removable plugs of magnetic material at the respective outer ends of the axially aligned solenoid coils. The presence of these plugs results in bringing into play an additional force acting on the plunger near each end of the stroke of the latter and the engine runs at a higher rate of speed with a given current flowing through the coils than when one or both plugs are removed. This innovation demonstrates that the efficiency of an electromagnetic engine is greater when the "air-gap pull" is utilized.

Referring now to the drawings by reference numerals and accompanying lead lines, it will be seen that the base plate is denoted by the numeral 8 and this is of general rectangular form and is provided on its bottom at opposite ends with supporting feet 10 and 12. At the left hand end is a vertical supporting flange 14. At the opposite end of the base I provide suitable uprights 16 and 18 and these are provided with appropriate bearings for a horizontal crankshaft 20 whose single crank portion is denoted at 22. The crankshaft is preferably provided on opposite ends with suitably keyed flywheels 24 and 26 with or without pulleys 28—28. Directly underneath of the crankshaft the base is provided with a straight slot 30 and outwardly of this with an indicator scale 32, which features will be hereinafter more specifically referred to.

With reference to the left hand end portion shown in Fig. 1 the numeral 34 designates a suitable source of electrical energy which may be either A. C. or D. C. current but here, takes the form of a battery. An ammeter 36 is electrically connected to one side of the battery and by a wire 38 is grounded on the base by way of a non-insulated binding post 40. There is another binding post on the opposite end of the flange and this is denoted by the numeral 42 and this is insulated at 44 and by way of wire 46 is connected with a rheostat 48 which in turn is connected with the battery 34.

The electromagnetic engine is appropriately supported on the flange as at 50 (see Fig. 2). This comprises coils 52 and 54 wound on an open ended suitably flanged spool-type cylinder 56 of non-magnetic material. The cylinder serves to accommodate the reciprocating plunger or piston (of magnetic material) and said piston 58 is reciprocable in the cylinder and its non-magnetic rod 60 is hingedly connected at 62 to a pitman or connecting rod 64 which in turn is operatively connected to the crank 22 thus to translate the reciprocating motion of the piston into rotary motion for the crankshaft. The coils 52 and 54 are connected by wires 66 and 68 to the insulated binding post 42. A centrally bored plug of magnetic material, denoted at 70 is fitted removably in the left hand portion of cylinder 56. A corresponding plug, also of magnetic material, and denoted at 72 is fitted removably into the opposite end of the cylinder and the rod 60 operates through the central aperture with suitable clearance. The apertures in these plugs constitute air vents so as not to interfere with the travel or reciprocation of the piston in the cylinder. In actual practice these plugs may be held in place by friction; or, suitable fastenings (not shown) may be employed to retain them in set positions. Plug 72 may be split longitudinally through its axis to facilitate removal and replacement without disassembling rod 60 and connecting parts.

Taking up now the circuit make and break or commutator means, reference is had to Figures 5 and 6 wherein it will be seen that the crankshaft is provided with longitudinally spaced integral segmental contacts 74 and 76 respectively. These are on diametrically opposite sides of the crankshaft and fit into notches provided therefor in the end portions of a sleeve of insulation 78 which is fitted on the crankshaft in the manner shown. These contacts are obviously adapted to accommodate and mate with resilient contact fingers or brushes 80 and 82 which are fixed to and rise from a block 84 of insulation material. The block is keyed for operation in the aforementioned slot 30. A lever arm 86 is situated beneath the base and pivoted for swinging at one end as at 88. The intermediate portion of the arm is connected at 90 with the block 84. The free end portion of the arm, the portion 92, projects beyond the transverse edge of the base and is provided with an index 94 for coaction with scale graduations 96, 98 and 100 and 102 and 104 on said scale, in an obvious manner. The graduations are properly lined up for predetermined coaction with the index 94 and complemental parts of the stated commutator means.

A wire 106 from coil 52 is electrically connected with brush 82 and a similar wire 108 connected with coil 54 at one end and with the remaining brush 80 at the opposite end.

For simplicity of understanding, the commutator on the crankshaft may be visualized as divided by dotted lines into a neutral zone A, a forward single and double-acting zone B and a reverse single and double-acting zone C.

In Fig. 1, the pointer 94 on lever 86 is shown opposite the central zone A, mark 96 and both brushes 80 and 82 are spaced between the two commutator segments 74 and 76 so no electrical circuits are completed when the crankshaft is rotated, and the engine stops. If lever 86 is shifted to position 98 the brush 82 is shifted to a position where it makes contact with commutator segment 76 when the crankshaft is rotated. This electrical contact is made when the flywheels and crankshaft are rotated slightly in a clockwise direction (at which time the crank is somewhat below the extreme forward "on-center" position) and completes the circuit through coil 52. The flow of current through this coil will result in a magnetic force tending to pull the plunger 58 into the coil 52 and to rotate the crankshaft and flywheels in a clockwise direction. If the source of electrical energy 34 is adequate to cause a relatively large current to flow through coil 52, the force exerted on the plunger will be sufficient to rotate the flywheels 24—26, and the kinetic energy acquired by the flywheels during the time this force is acting will be sufficient to rotate the flywheels and crank back to the initial position where the commutator segment 76 again contacts the brush 82 for a portion of the cycle determined by the width of the commutator segment, and the cycle is repeated. Under these conditions the engine will run in a clockwise direction as a "single-acting" engine.

If the lever 86 is shifted to position 100, the commutator segment 76 continues to make contact with the brush 82 on the back stroke, when the crank 22 is below center, and also makes contact with brush 80 on the forward stroke when the crank is above center and when the center of plunger 58 is considerably to the left of the center of coil 54. Thus, coil 54 is energized on the forward stroke and the crank receives two similar power impulses per revolution and operates as a "double-acting" engine.

When lever 86 is shifted to position 102, the commutator segment 74 will contact brush 80 and energize coil 54 when the crank is slightly below center, and a power impulse will be imparted to the crank to cause it to rotate in a counterclockwise direction, and the engine operates "single-acting" in a direction opposite to that obtained with the lever in position 98. Similarly, with the control lever 86 in position 104, the engine operates "double-acting" in a direction opposite to that with the control lever in position 100.

The various motions described above will take place with a suitable flow of current through coils regardless of whether the plugs of magnetic material are in place. However, if one or both plugs are in place, the engine will run on less current, as indicated by the ammeter 36, than if one or other of plugs 70—72 are removed. For example, if plug 70 is inserted into the end of coil 52 when this coil is energized by a flow of current, there will be an attractive force between the left hand end of plunger and plug 70. This force is known as the "air gap" pull and increases as the plunger moves closer to the plug. This force is in addition to that resulting from the "solenoid pull" which is caused by the magnetic field of the coil alone, which tends to center the plunger within the coil.

In a similar manner, the plug 72 adds to the force acting to move the plunger to the right when coil 54 is energized by an electric current.

A variable resistance is indicated at 48 to regulate the current flowing through each coil when its circuit is completed by means of its commutator segment and brush. A similar variable resistance may be used when operating on alternating current with a fixed potential, or an auto-transformer may be used to provide a variable alternating potential and current to give the desired speed variation.

From the above description it is seen that this engine may be operated as a "single-acting" or as a "double-acting" engine, both forward and reverse, by adjusting the position of a single control lever. All electrical circuits and contact devices, as well as mechanical devices, necessary to accomplish these results are in plain sight so that all principles involved in accomplishing these results are readily apparent and easily understood by the operator. When power is supplied by batteries it can be easily demonstrated that the engine will operate on lower voltage, or fewer battery cells, when operating "double-acting" than when operating "single-acting." Similar demonstrations can be made when operating on alternating current with an auto-transformer or other device for carrying the voltage. Also, with constant voltage, it is readily demonstrated that the engine will run much faster, and smoother, when operating "double-acting."

It is also readily demonstrated that the power, or speed, and efficiency are increased by taking advantage of the "air-gap pull" when operating at a fixed potential.

This device makes it possible to operate on alternating or direct current, either forward or reverse, under five distinct conditions, as follows:

1. Single-acting, utilizing the "solenoid pull" alone.

2. Double-acting, utilizing the "solenoid pull" alone.

3. Single-acting, utilizing the "solenoid pull" plus the "air-gap" pull.

4. Double-acting, utilizing the "solenoid pull" in both directions and the "air-gap pull" in only one direction.

5. Double-acting, utilizing both the "solenoid pull" and the "air-gap pull" in both directions.

The spool-like coil winding cylinder 56 and insulating sleeve 78, may be made of transparent materials, preferably thermo-setting plastics, to make clearly visible the method of construction of these parts.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a toy of the class shown and described, a base provided with uprights having bearings, a crankshaft above said base and having end portions journalled for rotation in said bearings, said shaft having radial segmental contacts on diametrically opposite sides and spaced longitudinally from one another, a sleeve of insulation material surrounding said shaft and provided at its ends with notches coacting with and exposing the respective contacts, a block of insulation material slidably mounted on said base beneath said shaft, and a pair of individually and collectively actuable contact fingers attached to and rising from said block, located on diametrically opposite sides of said sleeve and selectively cooperable with the latter and said contacts.

2. The structure recited in claim 1, wherein said fingers constitute brushes and are spaced longitudinally from each other, a manually adjustable lever swingably pivoted on said base, said lever being connected to said block for shifting the latter and having an end portion projecting beyond the base and provided with an index, and an indicator scale on said base lined up for coaction with the sleeve, contacts, brushes and index.

3. An electro-mechanical toy of the class described comprising, in combination, a base, bearing means mounted on said base, a crankshaft journaled for rotation in said bearing means and having a central single crank, said crankshaft also having longitudinally spaced, fixedly mounted contact elements, a sleeve of insulation material surrounding said crankshaft and interposed between said elements, at least one flywheel keyed on one end of said crankshaft, a pair of individually and collectively actuable contact fingers located on opposite sides of said sleeve and collectively and individually cooperable with the latter and said contact elements, manually adjustable means mounting said contact fingers shiftably on said base, an open-ended cylinder, longitudinally spaced coils mounted on said cylinder, a single plunger mounted for reciprocation in said cylinder and adapted to be acted on either by one of said coils or, alternatively, by both of said coils in predetermined progression, and an operating connection between said plunger and crank.

4. The structure specified in claim 3 together with an insertable and removable apertured plug of magnetic material fitted into one end of said cylinder, a sectional centrally apertured plug of magnetic material fitted into the opposite and of said cylinder, said operating connection operating slidably through the aperture in the second-named plug.

5. An educational electro-mechanical toy expressly constructed to acquaint one with certain underlying principles of electricity and mechanics comprising a base, bearing means on said base, a crankshaft journaled for rotation in said bearing means and embodying a single crank, a single-acting as well as double-acting electromagnetic prime mover mounted on said base, said prime mover embodying a single cylinder having longitudinally spaced electromagnetic coils thereon, a single magnetic plunger reciprocable in said cylinder, an operating connection between said plunger and crank for rotating said crankshaft in a forward or a reverse direction, either single-acting or double-acting in either of said directions, said prime mover utilizing the force of "solenoid-pull" alone in rotating the crankshaft in either of the stated directions, and manually regulate circuit make-and-break means for cutting said prime mover "in" and "out" of operation and for alternately and independently energizing and deenergizing said coils in predetermined sequence, said circuit make-and-break means embodying contact segments carried by said crankshaft at longitudinally spaced points, a sleeve of insulation material surrounding the crankshaft and coacting with the segments in defining a central neutral zone and forward and reverse zones for both single-acting and double-acting operations to the right and left, respectively, of said neutral zone, and contact fingers adjustably mounted on said base beneath said sleeve and rising from the base and located on diametrically opposite sides of the sleeve and selectively cooperable with the latter and said segments.

6. The structure defined in claim 3, and readily insertable and removable magnetic plug means at one end of said cylinder for optionally utilizing or eliminating the added force of the "air-gap-pull" and to supplement "solenoid pull."

7. The structure defined in claim 3, and readily insertable and removable magnetic plugs fitted into the respective ends of said cylinder for engendering and contributing the added force "air-gap-pull" within the space between the respective plugs, the latter supplementing the "solenoid pull" and acting on the plunger alternately regardless of the direction of movement of the latter in said cylinder.

ROY L. CHENAULT.

REFERENCES CITED

The following references are of record in the file of this patent:

UNITED STATES PATENTS

| Number | Name | Date |
|---|---|---|
| 357,374 | Darling | Feb. 8, 1887 |
| 830,800 | Mortimer | Sept. 11, 1906 |
| 1,349,100 | Reynolds | Aug. 10, 1920 |
| 1,568,210 | Colstad | Jan. 5, 1926 |

FOREIGN PATENTS

| Number | Country | Date |
|---|---|---|
| 447,658 | Great Britain | May 22, 1936 |